(12) United States Patent
Zhang et al.

(10) Patent No.: US 12,267,702 B2
(45) Date of Patent: Apr. 1, 2025

(54) METHOD FOR BEAM FAILURE RECOVERY BASED ON UNIFIED TCI FRAMEWORK

(71) Applicant: Apple Inc., Cupertino, CA (US)

(72) Inventors: Yushu Zhang, Beijing (CN); Andre Janssen, Munich (DE); Haitong Sun, Cupertino, CA (US); Wei Zeng, Saratoga, CA (US); Dawei Zhang, Saratoga, CA (US); Yeong-Sun Hwang, Germering (DE); Franz J. Eder, Neubiberg (DE)

(73) Assignee: Apple Inc., Cupertino, CA (US)

( * ) Notice: Subject to any disclaimer, the term of this patent is extended or adjusted under 35 U.S.C. 154(b) by 511 days.

(21) Appl. No.: 17/438,139

(22) PCT Filed: Mar. 31, 2021

(86) PCT No.: PCT/CN2021/084359
§ 371 (c)(1),
(2) Date: Sep. 10, 2021

(87) PCT Pub. No.: WO2022/205053
PCT Pub. Date: Oct. 6, 2022

(65) Prior Publication Data
US 2022/0322113 A1  Oct. 6, 2022

(51) Int. Cl.
*H04W 24/04* (2009.01)
*H04L 5/00* (2006.01)
*H04W 24/08* (2009.01)

(52) U.S. Cl.
CPC ............. *H04W 24/04* (2013.01); *H04L 5/001* (2013.01); *H04W 24/08* (2013.01)

(58) Field of Classification Search
CPC ..... H04W 76/18; H04W 24/10; H04W 76/19; H04W 24/08; H04W 24/04; H04B 7/0695;
(Continued)

(56) References Cited

U.S. PATENT DOCUMENTS

2019/0037604 A1* 1/2019 Akkarakaran .......... H04L 5/001
2021/0282168 A1* 9/2021 Matsumura .......... H04L 5/0048
(Continued)

FOREIGN PATENT DOCUMENTS

CN  110351112     10/2019
CN  112352387 A   2/2021
(Continued)

OTHER PUBLICATIONS

International Search Report and Written Opinion for PCT/CN2021/084359; 9 pages; Dec. 31, 2021.
(Continued)

*Primary Examiner* — Syed Ali
(74) *Attorney, Agent, or Firm* — Kowert, Hood, Munyon, Rankin & Goetzel, P.C.

(57) ABSTRACT

Apparatuses, systems, and methods for beam failure recovery based on a unified TCI framework. A UE may receive, from a base station, a configuration for a BFR procedure for a CCG. The CCG may include at least two CCs and the UE may periodically receive, from the base station, at least a first BFD RS and a first CBD RS in a first CC included in the CCG. The UE may detect, based on the first BFD RS, a beam failure in at least the first CC and send, to the base station, a BFRQ. The BFRQ may include a candidate beam selected based on at least the first CBD RS and may be sent via a PRACH or MAC CE. The UE may receive, from the base station, a BFR response and apply the candidate beam to the first CC and at least one additional CC of the CCG.

20 Claims, 13 Drawing Sheets

(58) Field of Classification Search
CPC ......... H04B 7/088; H04B 7/063; H04L 5/001; H04L 5/0051; H04L 5/0023
See application file for complete search history.

(56) References Cited

U.S. PATENT DOCUMENTS

| | | | | |
|---|---|---|---|---|
| 2023/0006726 A1* | 1/2023 | Huang | .................. | H04W 76/19 |
| 2023/0023041 A1* | 1/2023 | Yi | .......................... | H04L 5/0048 |
| 2023/0050015 A1* | 2/2023 | Kang | .................... | H04L 5/0094 |
| 2023/0164865 A1* | 5/2023 | Kang | .................... | H04B 7/0408 |
| | | | | 370/329 |
| 2023/0179263 A1* | 6/2023 | Zhang | .................. | H04B 7/0695 |
| | | | | 375/267 |
| 2023/0254928 A1* | 8/2023 | Matsumura | .............. | H04B 7/08 |
| | | | | 370/225 |
| 2023/0284197 A1* | 9/2023 | Zhang | ................. | H04W 72/231 |
| | | | | 370/225 |
| 2023/0319936 A1* | 10/2023 | Go | ........................ | H04L 5/0094 |
| 2023/0328830 A1* | 10/2023 | Yi | .......................... | H04W 76/19 |
| | | | | 370/329 |
| 2024/0121641 A1* | 4/2024 | Matsumura | ........... | H04L 5/0051 |
| 2024/0172312 A1* | 5/2024 | Harada | ................. | H04L 5/0035 |
| 2024/0306015 A1* | 9/2024 | Matsumura | ........... | H04W 16/28 |
| 2024/0314767 A1* | 9/2024 | Zhang | ............... | H04W 72/1263 |

FOREIGN PATENT DOCUMENTS

| | | |
|---|---|---|
| CN | 112400283 | 2/2021 |
| WO | 2020057665 A1 | 3/2020 |
| WO | 2020164579 | 8/2020 |
| WO | 2020264134 | 12/2020 |

OTHER PUBLICATIONS

Intel Corporation "On Test cases for Beam Failure Detection and Link Recovery"; 3GPP TSG-RAN WG4 Meeting #89 R4-1814564; Spokane, USA; 2 pages; Nov. 16, 2018.

Office Action for CN Application No. 202180005673.4; Nov. 12, 2024.

* cited by examiner

METHOD FOR BEAM FAILURE RECOVERY BASED ON UNIFIED TCI FRAMEWORK

PRIORITY CLAIM INFORMATON

This application is a U.S. National Stage application of International Application No. PCT/CN2021/084359, filed Mar. 31, 2021, titled "Method for Beam Failure Recovery based on Unified TCI Framework", which is hereby incorporated by reference in its entirety.

FIELD

The invention relates to wireless communications, and more particularly to apparatuses, systems, and methods for beam failure recovery based on a unified Transmission Configuration Indicator (TCI) framework, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for beam failure recovery based on a unified Transmission Configuration Indicator (TCI) framework, e.g., in 5G NR systems and beyond.

For example, in some embodiments, a user equipment device (UE), such as UE 106, may be configured to receive, from a base station, a configuration for a beam failure recovery (BFR) procedure for a component carrier (CC) group (CCG). The CCG may include at least two CCs. Additionally, the UE may be configured to periodically receive, from the base station, at least a first beam failure detection (BFD) reference signal (RS) and a first candidate beam detection (CBD) RS in a first CC of the at least two CCs included in the CCG and to detect, based on the first BFD RS, a beam failure in at least the first CC. The UE may be configured to send, to the base station, a beam failure recovery (BFR) request (BFRQ). The BFRQ may include a candidate beam selected based on at least the first CBD RS. The BFRQ may be sent via a physical random access channel (PRACH) or a medium access control (MAC) control element (CE). Further, the UE may be configured to receive, from the base station, a BFR response and to apply the candidate beam to the first CC and at least one additional CC of the CCG. In some instances, the UE may wait a configured number of symbols after receipt of the BFR response prior to applying the candidate beam. The configured number of symbols may include an offset. The offset may account for a cross-CC beam indication. In some instances, the UE may report the offset via a UE capability. In some instances, the UE may receive, from the base station, a configuration message that may indicate the offset. Additionally, the offset may be predefined, e.g., by standard and/or network/UE preference.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
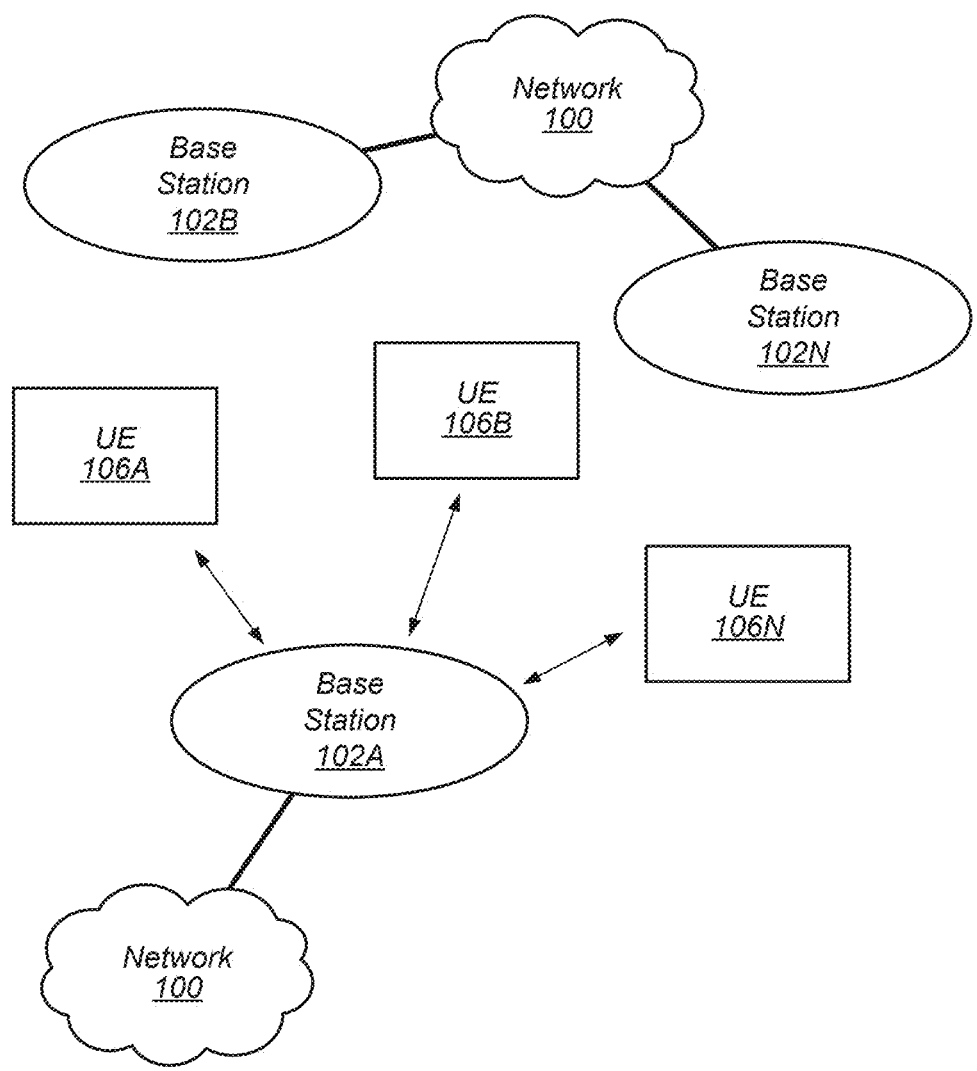
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") — any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
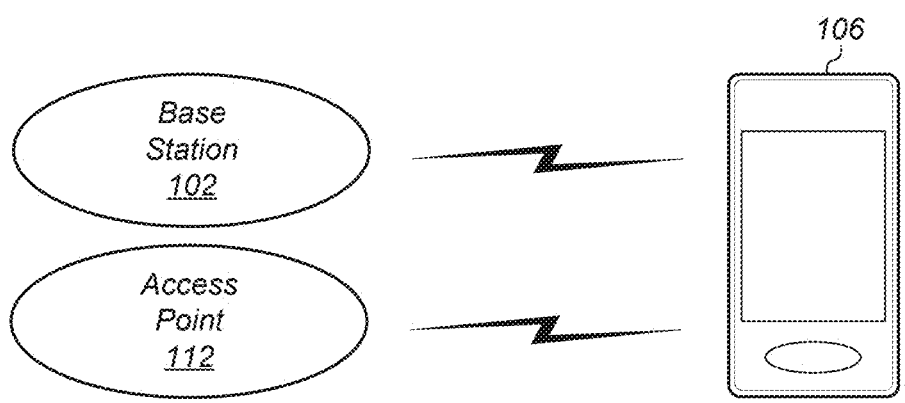
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 2:
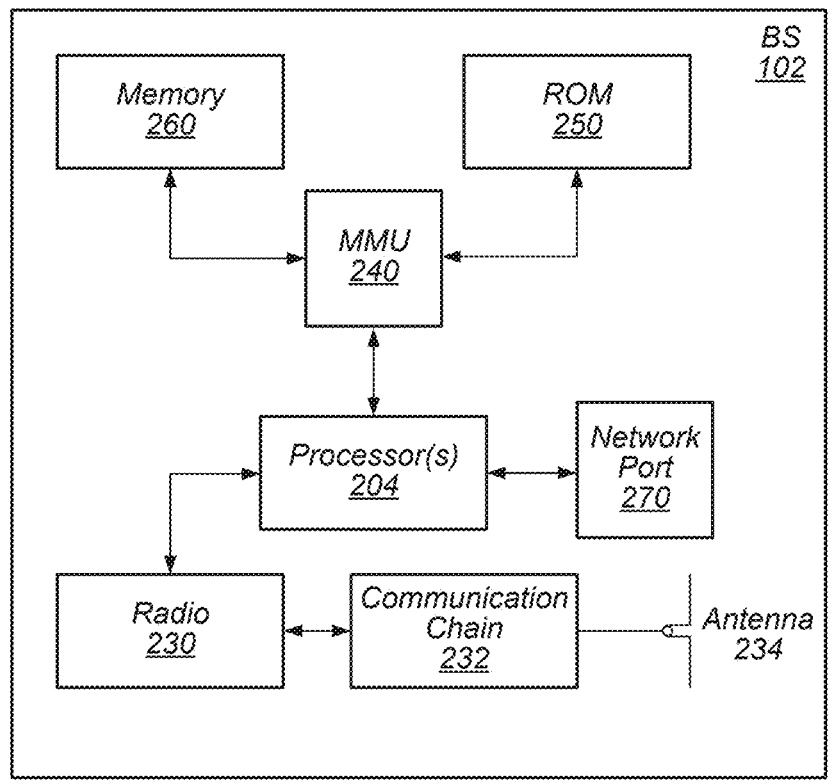
FIG. 2 illustrates an example block diagram of a base station, according to some embodiments.

FIG. 2: Block Diagram of a Base Station

Figure 3:
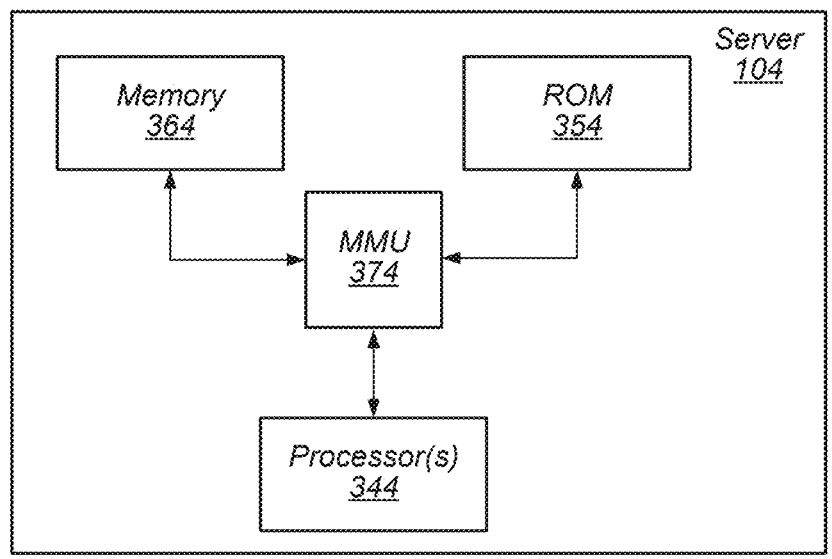
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
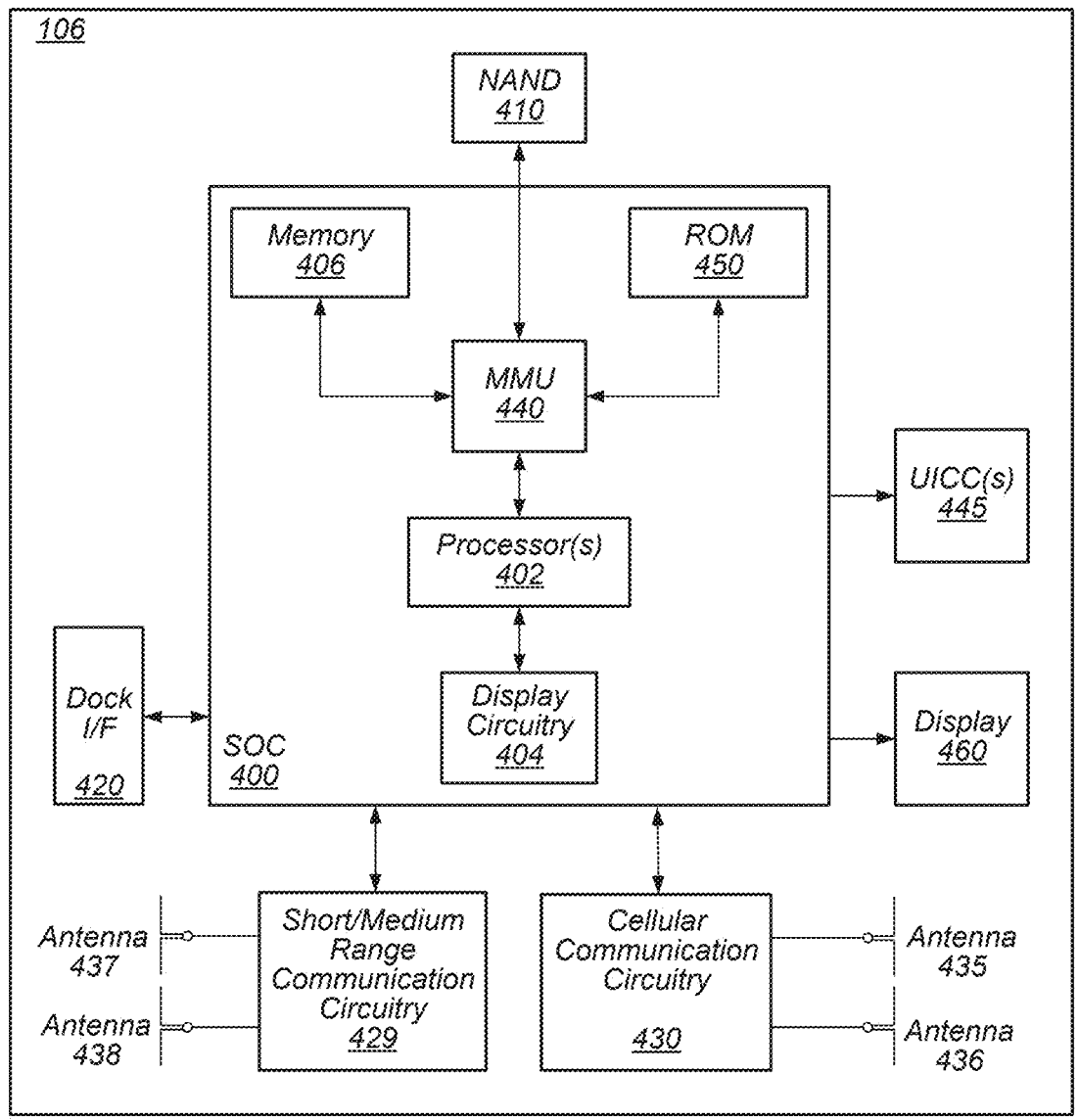
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMS may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMS, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
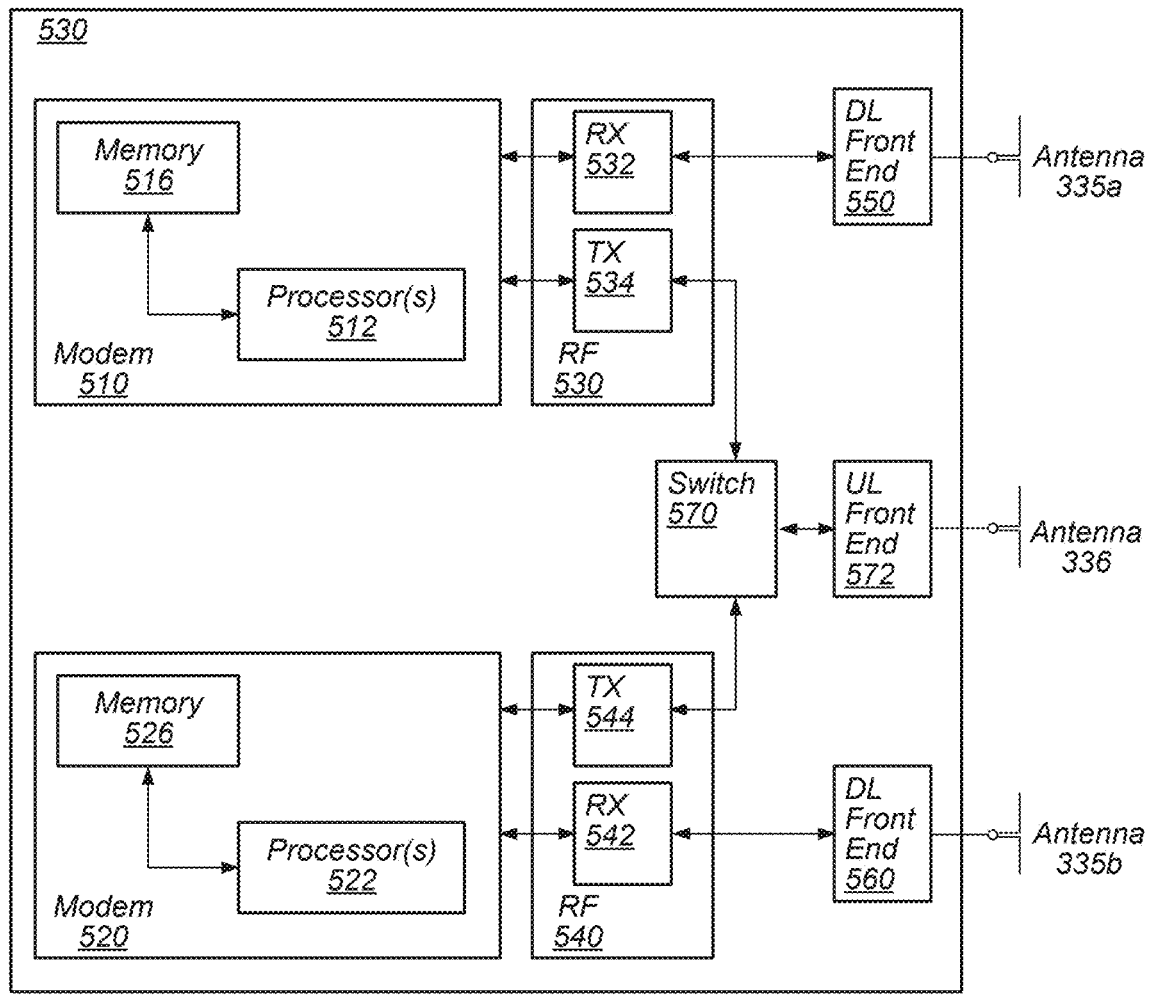
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
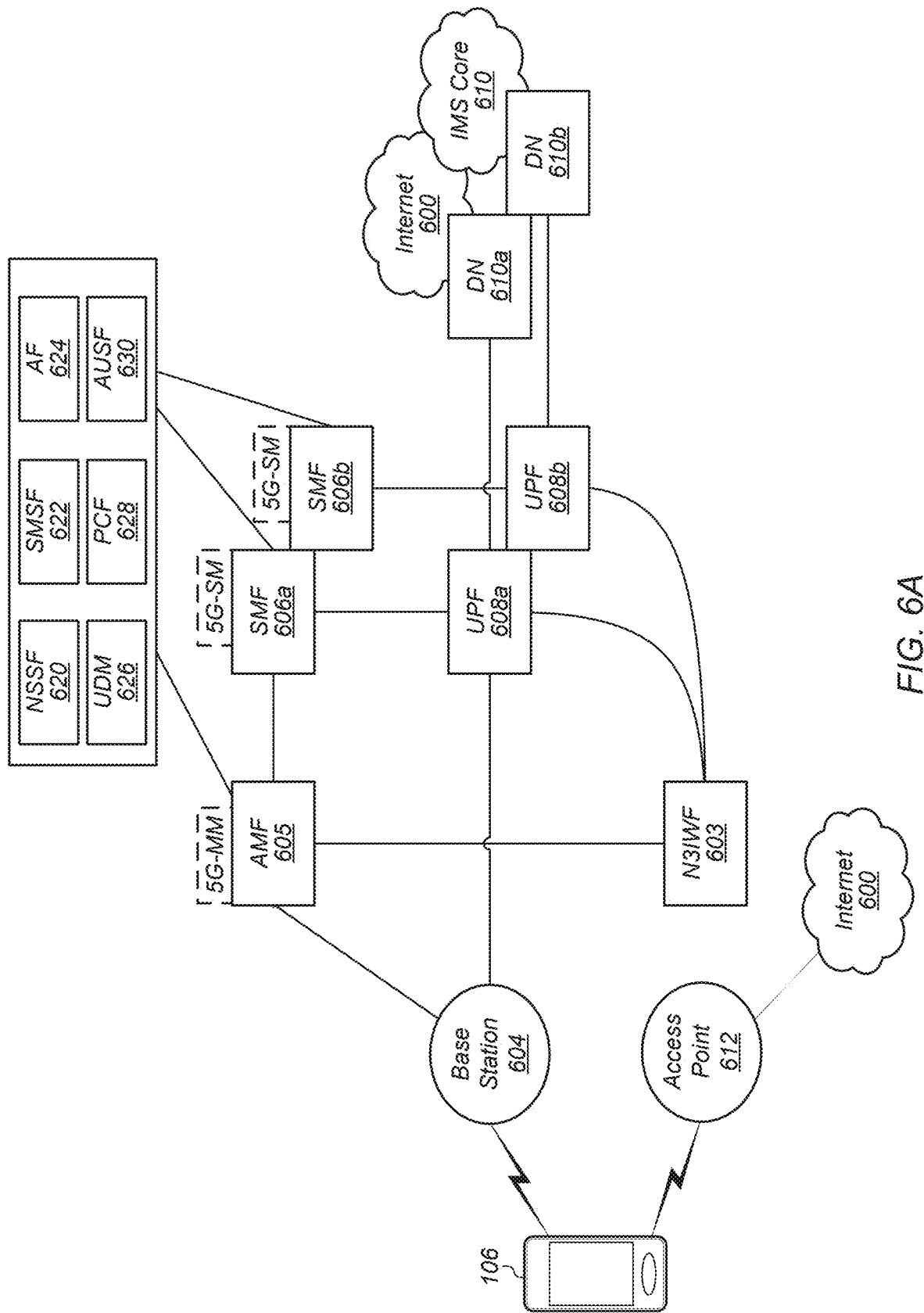
FIG. 6A illustrates an example of a 5G network architecture that incorporates both 3GPP (e.g., cellular) and non-3GPP (e.g., non-cellular) access to the 5G CN, according to some embodiments.
Figure 6B:
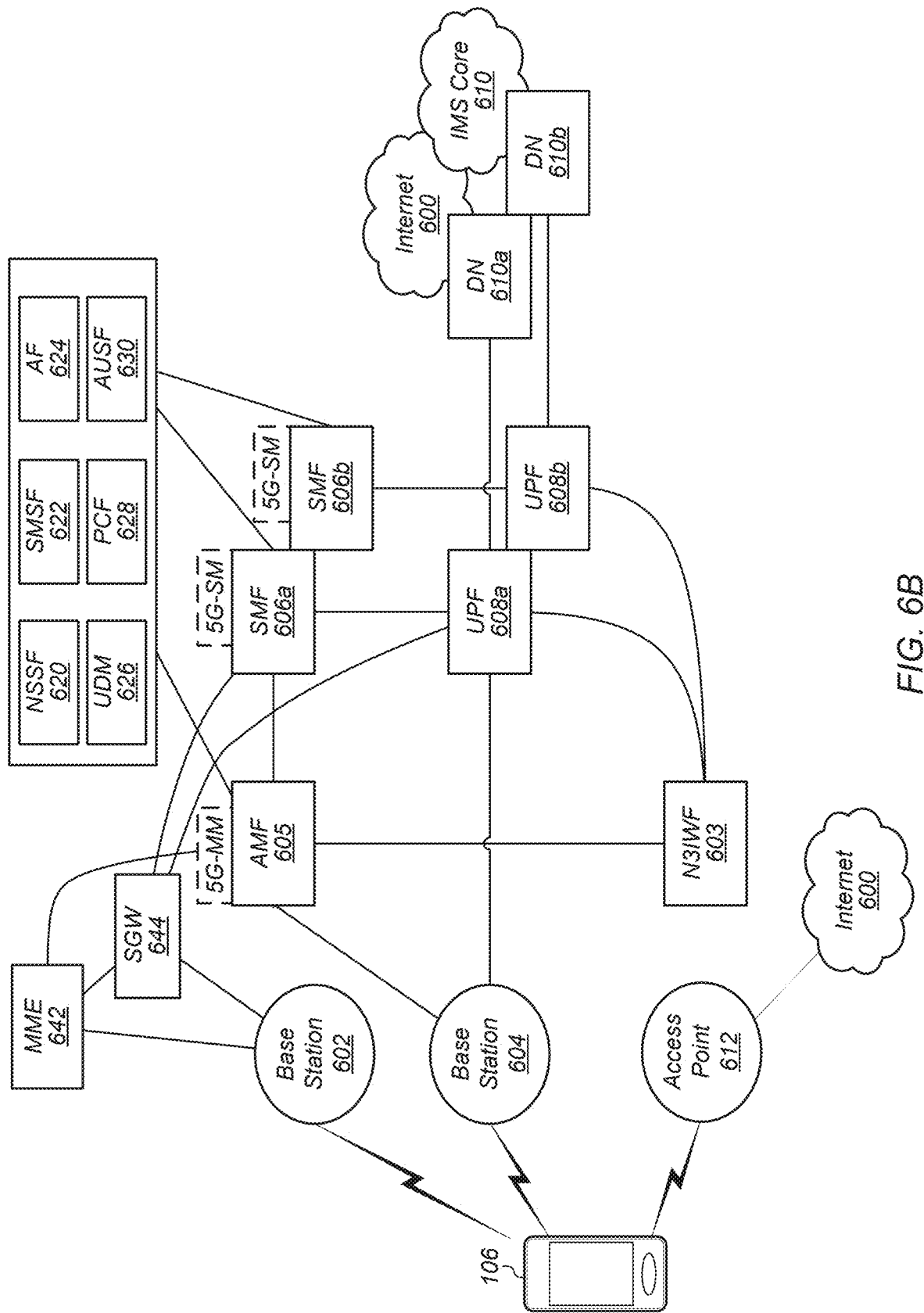
FIG. 6B illustrates an example of a 5G network architecture that incorporates both dual 3GPP (e.g., LTE and 5G NR) access and non-3GPP access to the 5G CN, according to some embodiments.
Figure 7:
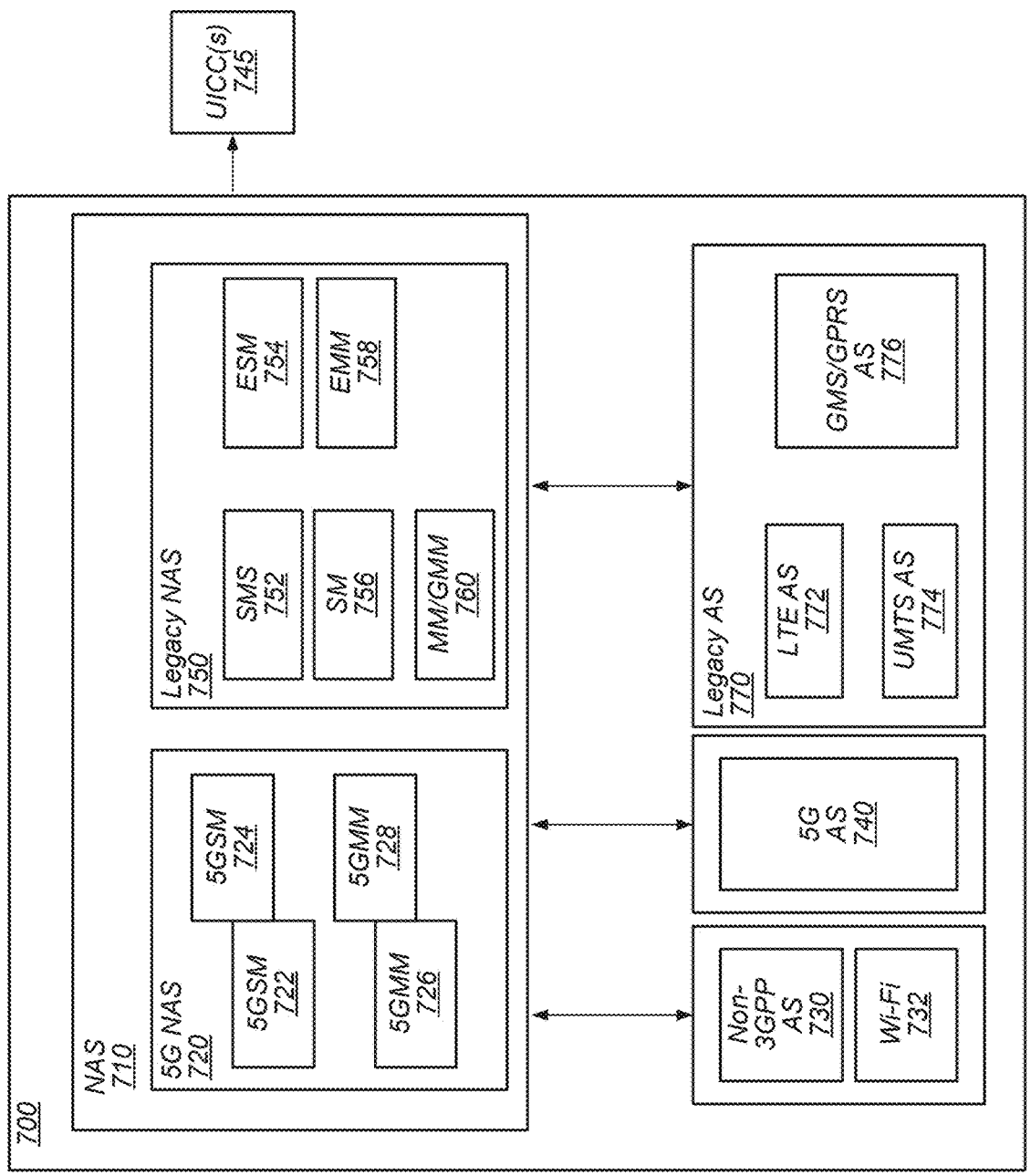
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above described network entities may be configured to perform methods to improve security checks in a 5G NR network, including mechanisms beam failure recovery based on a unified TCI framework, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods beam failure recovery based on a unified TCI framework, e.g., in 5G NR systems and beyond, e.g., as further described herein.

Beam Failure Recovery

New cellular communication techniques are continually under development, e.g., to increase coverage, to better serve the range of demands and use cases, and for a variety of other reasons. As new cellular communication technologies are developed and deployed, certain features may be included that are new or differ from previously developed and deployed cellular communication technologies.

For example, recent standards work (e.g., 3GPP standards work) has introduced a unified Transmission Configuration Indicator (TCI) framework. The unified TCI framework supports downlink (DL) TCI, uplink (UL) TC, and joint DL/UL TCI. DL TCI may be used for beam indication for downlink signals, e.g., such as physical downlink control channel (PDCCH) and/or physical downlink shared channel (PDSCH) as well as for all component carriers (CCs) in a band or a band group. The UL TCI may be used for beam indication for uplink signals, e.g., such as physical uplink control channel (PUCCH), physical uplink shared channel (PUSCH), and/or sounding reference signal (SRS) as well as for all CCs in a band or a band group. The joint DL/UL TCI may be used for beam indication for both uplink and downlink signals, e.g., such as PDCCH, PDSCH, PUCCH, PUSCH, and/or SRS as well as for all CCs in a band or a band group. Note that a CC may indicate a serving cell as defined by 3GPP TS 38.321. The 3 types of TCI indications defined by the unified TCI framework may be switched dynamically, e.g., by downlink configuration indicator (DCI), and/or semi-statically, e.g., by medium access control (MAC) control element (CE) and/or radio resource control (RRC) signaling. Further, the unified TCI may be indicated by MAC CE and/or MAC CE and DCI, e.g., the DCI may be used to down-select TCI(s) indicated by MAC CE.

Figure 8:
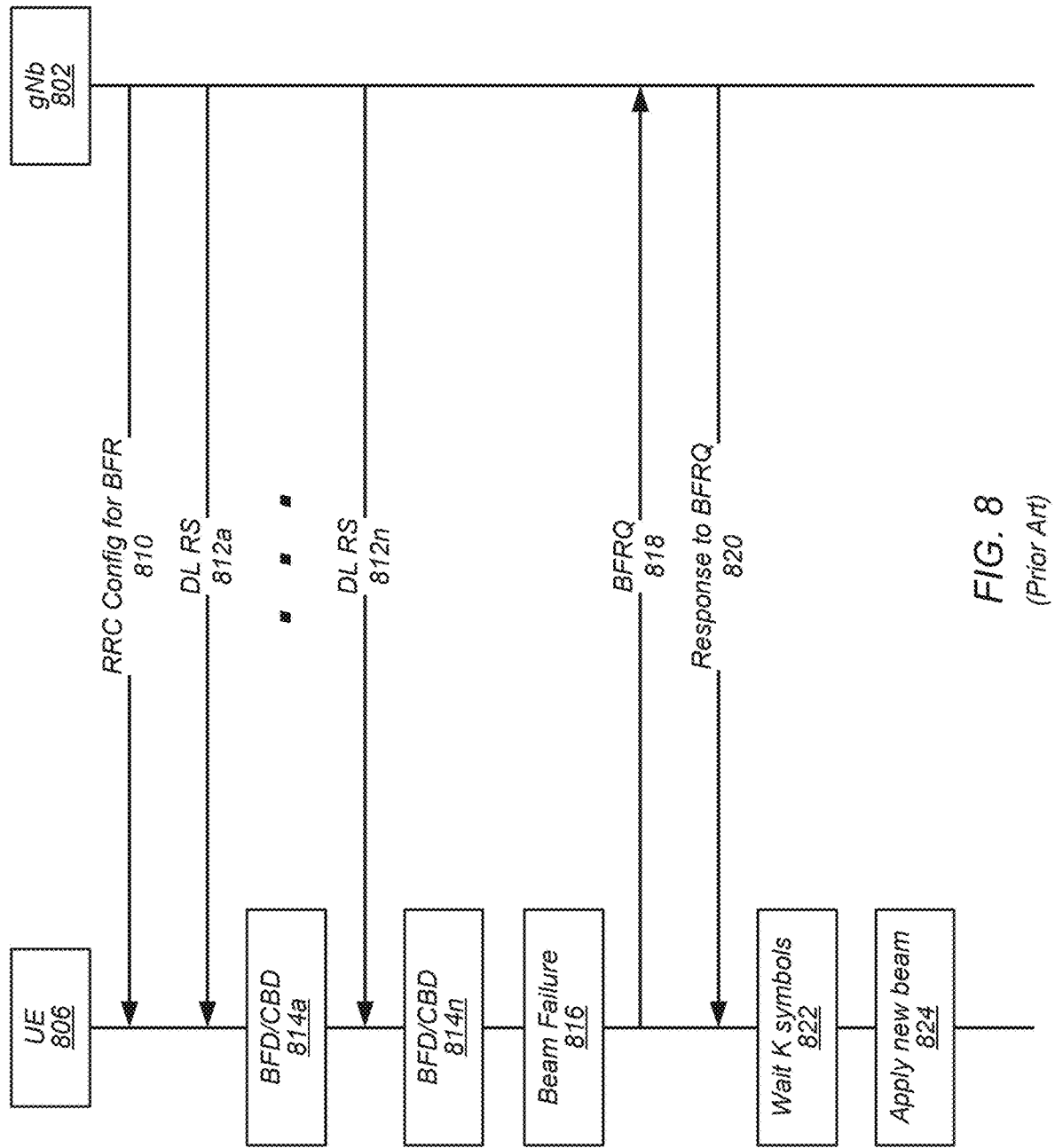
FIG. 8 illustrates an example of signaling for a beam failure recovery (BFR) procedure.

Additionally, recent standards (e.g., 3GPP Release 15 and 16) include support of a beam failure recovery (BFR) mechanism, e.g., as illustrated by FIG. 8. As shown, a UE 806 may receive an RRC configuration for BFR 810 from a base station (gNB 802). The gNB 802 may provide one or more downlink (DL) reference signals (RSs) for beam failure detection (BFD) and/or candidate beam detection (CBD), e.g., such as DL RSs 812a-n. The UE 806 may then detect beam quality for PDCCH to determine whether beam failure happens, e.g., BFD/CBD 814a-n. Note that the DL RS can be configured by the gNB 802 and the gNB 802 can configure additional RSs for candidate beam detection. As shown, when the UE 806 declares beam failure, e.g., beam failure 816, the UE may send a beam failure recovery request (BFRQ) 818 to the gNB 802 to report the candidate beam information. The gNB 802 may then provide the UE 806 with a BFRQ response 820. Once the UE 806 receive the BFRQ response 820, the UE 806 may wait K symbols to apply the candidate beam. Note that after K symbols, where K is typically 28 symbols, the UE 806 may automatically apply the candidate beam to PDCCH as well as PUCCH. Additionally, the UE 806 may update power control parameters for PUCCH as well. Note further that such a procedure may be performed for each component carrier (CC) independently.

However, based on the proposed unified TCI framework, a common beam should be applied for CCs in a band or band group, thus it may not be necessary to perform entire BFR procedures for each CC. Further, CC specific BFR may lead to higher UE power consumption, overhead for RSs for BFD/CBD/BFRQ, and potential beam mismatch across CCs.

Embodiments described herein provide systems, methods, and mechanisms to support UE beam failure recovery based on a unified TCI framework, including systems, methods, and mechanisms to support CC group (CCG) specific BFR. The systems, methods, and mechanisms include support for CCG specific BFD, CCG specific CBF, CCG specific BFRQ, and CCG specific beam update after BFR as well as support for a CCG to indicate CCs in a band or band group.

Figure 9A:
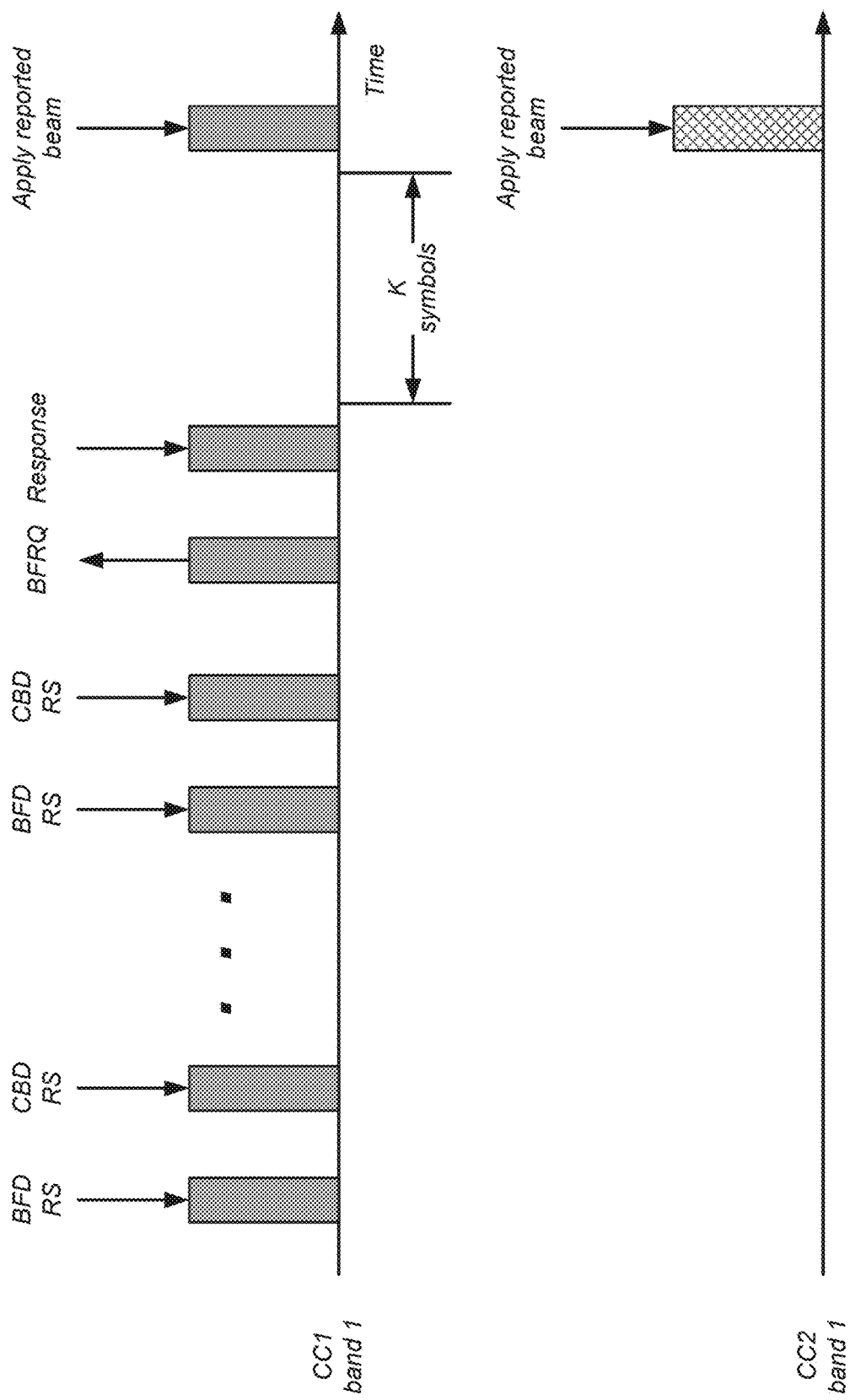
FIGS. 9A, 9B, 9C, and 9D illustrate examples of BFR procedures based on a unified Transmission Configuration Indicator (TCI) framework, according to some embodiments.

In some embodiments, a base station, e.g., such as base station 102, may configure one BFR procedure for a CCG. For example, in a CCG, BFR may be configured in only one active bandwidth part (BWP) in a CC. In such an instance, a UE, such as UE 106, may perform an entire BFR procedure in the CC. Then, upon notifying the base station of a beam failure and waiting K symbols after receiving a BFR response from the base station, the UE may apply a candidate beam detected in the CC to a subset of channels and/or all channels corresponding to a previously indicated unified TCI state for all CCs in the CCG, e.g., as illustrated by FIG. 9A. Thus, as shown, the UE may alternate receiving a beam failure detection (BFD) reference signal (RS) and a candidate beam detection (CBD) RS in a first CC, e.g., CC1, in a first band or bandwidth, e.g., band 1. Then, upon detection of a beam failure, the UE may send a beam failure recovery request (BFRQ) to the base station. The base station may send a beam failure recovery (BFR) response. The UE may then wait K symbols before applying a candidate beam detected in the CC. Additionally, the UE may apply the candidate beam detected in the CC to a second CC, e.g., CC2, also in the first band. In other words, since the second CC is in the same CCG as the first CC, both CCs correspond to a previously indicated unified TCI state and the UE may apply the candidate beam from the first CC to a subset of channels (CCs) and/or all channels (CCs) corresponding to the previously indicated unified TCI state. Note that, as an example, K may be selected as 28 symbols plus an offset, where the offset may be for cross-CC beam indication. The offset may be predefined and/or reported by a UE capability and/or configured by the base station. Note that the UE may send BFRQ via PRACH or a MAC CE. In some instances, whether to report BFRQ by PRACH or MAC CE may be predefined and/or configured by higher layer signaling, e.g., via RRC signaling or a MAC CE. In some instances, whether to report BFRQ by PRACH or MAC CE may be determined by a CC configured with BFR and/or whether a primary cell (PCell) and/or a primary secondary cell (PSCell) is included in the CCG. Note that for PCell/PSCell, PRACH may be used; otherwise, MAC CE may be used.

Figure 9B:
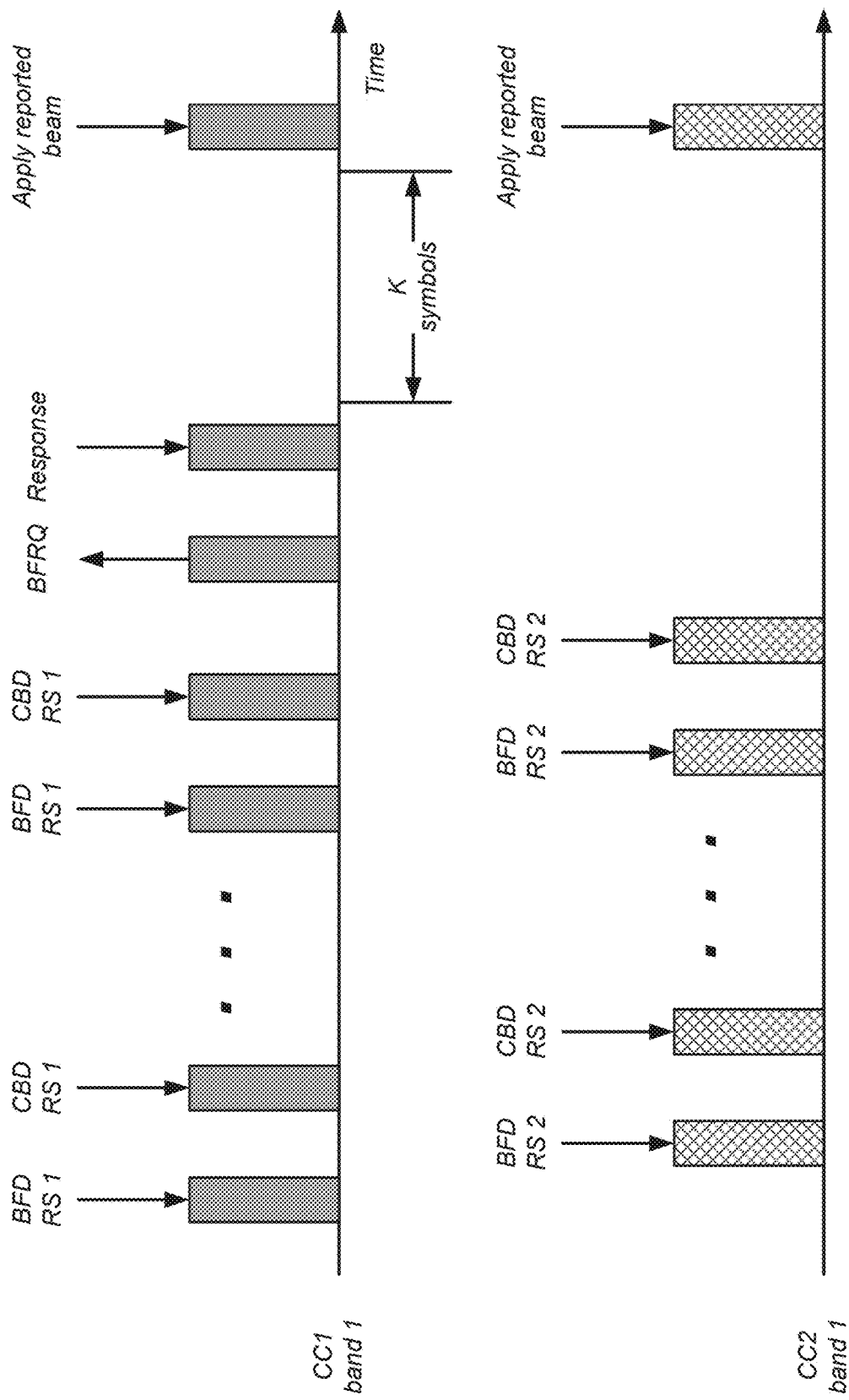

In some embodiments, cross CC BFD/CBD may be allowed with regard to some load balancing, e.g., as illustrated by FIG. 9B. For example, as shown in FIG. 9B, the UE may alternate receiving a first BFD RS and a first CBD RS in a first CC, e.g., BFD RS 1 and CBD RS 1 in CC1, in a first band or bandwidth, e.g., band 1, and receiving a second BFD RS and a second CBD RS in a second CC, e.g., BFD RS 2 and CBD RS 2 in CC2. Then, upon detection of a beam failure, the UE may send a BFRQ to the base station. The base station may send a BFR response. The UE may then wait K symbols before applying a candidate beam detected in the CC. Additionally, the UE may apply the candidate beam detected in the CC to the second CC, e.g., CC2, also in the first band. In other words, since the second CC is in the same CCG as the first CC, both CCs correspond to a previously indicated unified TCI state and the UE may apply the candidate beam from the first CC to a subset of channels (CCs) and/or all channels (CCs) corresponding to the previously indicated unified TCI state. Additionally, cross CC BFRQ may also be allowed and/or supported. For example, if and/or when PCell/PSCell is included in the CCG, BFRQ may be reported based on a PRACH config-ured in the PCell/PSCell. Note however, that only one BFR procedure may be configured.

Figure 9C:
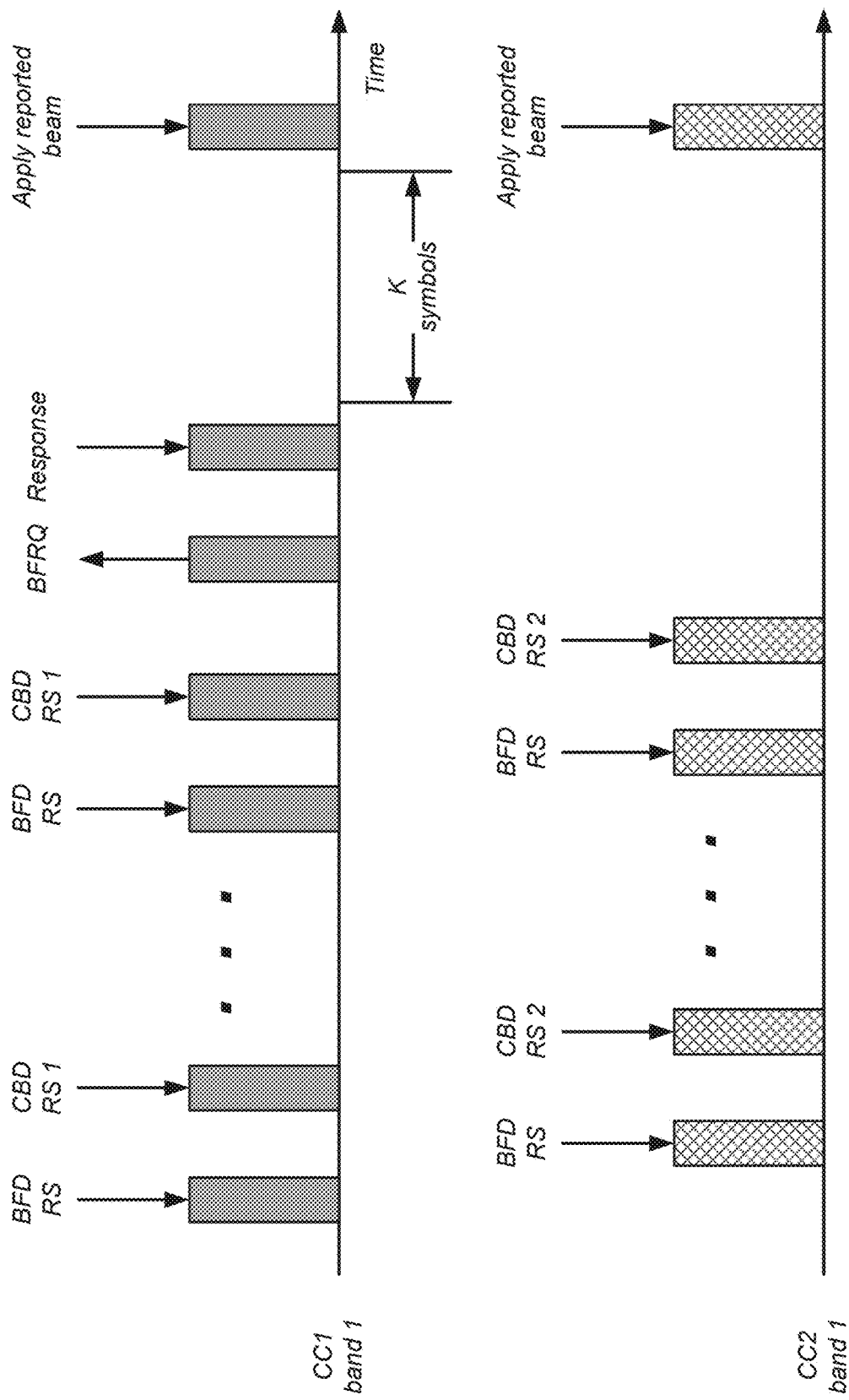

In some embodiments, a base station, such as base station 102, may configure multiple BFD procedures and one BFRQ procedure for a CCG. Note that, with regard to different interference levels in different CCs, a UE, such as UE 106, may perform BFD for each CC independently, e.g., as illustrated by FIG. 9C. For example, as shown in FIG. 9C, the UE may alternate receiving a BFD RS and a first CBD RS in a first CC, e.g., BFD RS and CBD RS 1 in CC1, in a first band or bandwidth, e.g., band 1, and the BFD RS and a second CBD RS in a second CC, e.g., BFD RS and CBD RS 2 in CC2. Then, upon detection of a beam failure, the UE may send a BFRQ to the base station. The base station may send a BFR response. The UE may then wait K symbols before applying a candidate beam detected in the CC. Additionally, the UE may apply the candidate beam detected in the CC to the second CC, e.g., CC2, also in the first band. In other words, since the second CC is in the same CCG as the first CC, both CCs correspond to a previously indicated unified TCI state and the UE may apply the candidate beam from the first CC to a subset of channels (CCs) and/or all channels (CCs) corresponding to the previously indicated unified TCI state. Additionally, a common CBD RS set may be configured for BFR for all CCs in the CCG. Further, the common CBD RS may be from the same CC or different CCs. The UE may trigger BFRQ when one CC fails or a subset of or all CCs in the CCG fail. Then, K symbols after a BFR response is received from the base station, the UE may apply the candidate beam to a subset of channels and/or all channels corresponding to a previously indicated unified TCI state for all CCs in the CCG. As an example, K may be selected as 28 symbols plus an offset, where offset is for cross-CC beam indication, which can be predefined and/or reported by UE capability and/or configured by base station. Note that BFRQ may be carried by PRACH and/or a MAC CE. In some instances, whether to report BFRQ by PRACH or MAC CE may be predefined and/or configured by higher layer signaling, e.g., by RRC signaling and/or a MAC CE. In some instances, whether to report BFRQ by PRACH or MAC CE may be determined by a CC configured with BFR and/or whether a PCell/PSCell is included in the CCG and/or whether a PCell/PSCell fails. Note that for PCell/PSCell, PRACH may be used; otherwise, MAC CE may be used.

Figure 9D:
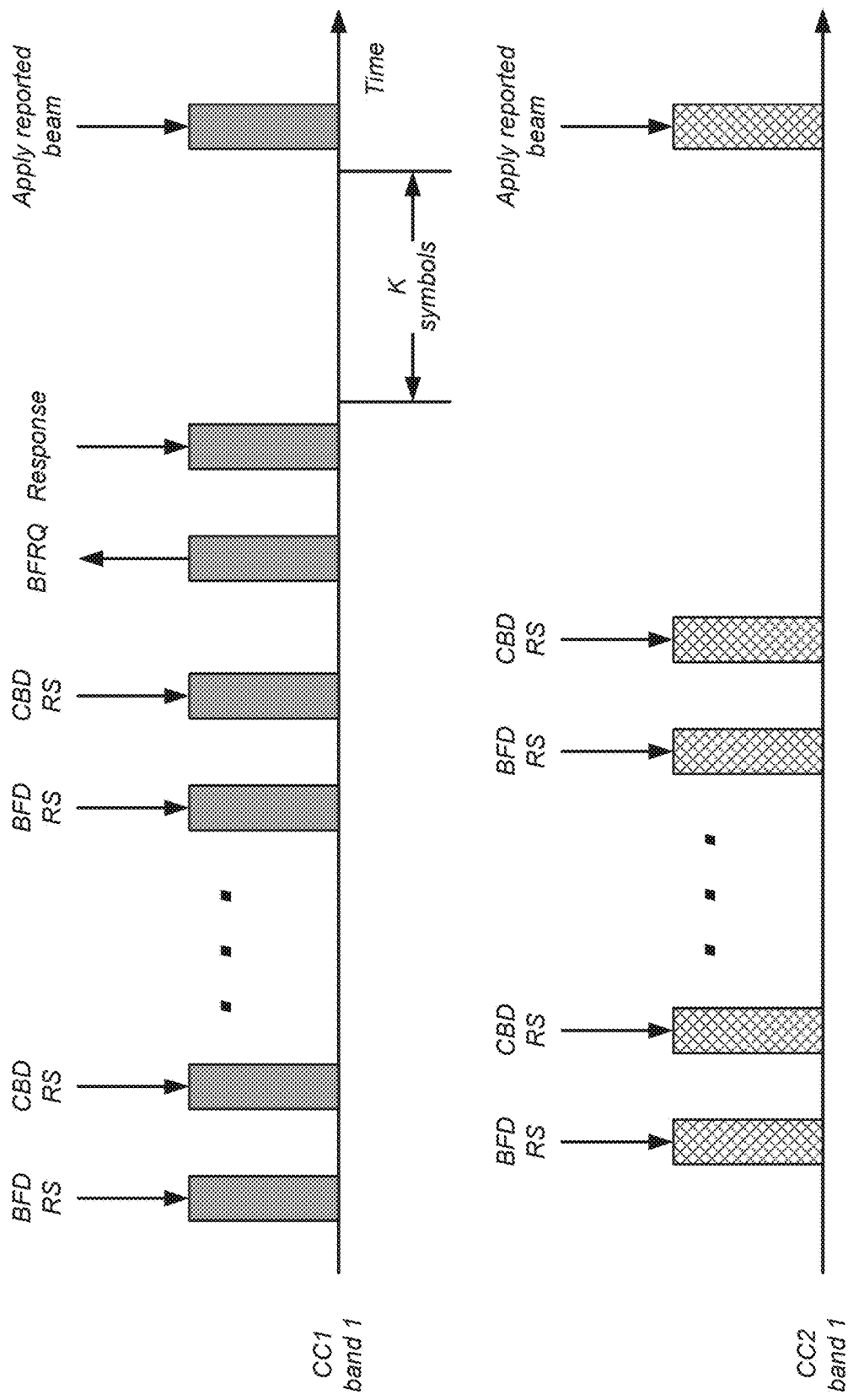

In some embodiments, a base station, such as base station 102, may configure multiple BFR procedures for a CCG, e.g., as illustrated by FIG. 9D. For example, as shown in FIG. 9D, a UE, such as UE 106, may alternate receiving a BFD RS and a CBD RS in a first CC, e.g., BFD RS and CBD RS in CC1, in a first band or bandwidth, e.g., band 1, and the BFD RS and the CBD RS in a second CC, e.g., BFD RS and CBD RS in CC2. Then, upon detection of a beam failure, the UE may send a BFRQ to the base station. The base station may send a beam failure recovery BFR response. The UE may then wait K symbols before applying a candidate beam detected in the CC. Additionally, the UE may apply the candidate beam detected in the CC to the second CC, e.g., CC2, also in the first band. In other words, since the second CC is in the same CCG as the first CC, both CCs correspond to a previously indicated unified TCI state and the UE may apply the candidate beam from the first CC to a subset of channels (CCs) and/or all channels (CCs) corresponding to the previously indicated unified TCI state. Additionally, the UE may report a maximum number of CCs in a CCG for BFR/BFD as a UE capability. Note that if and/or when the UE reports a maximum of one CC for BFR, the UE may fallback to the methods described above in reference to FIGS. 9A and 9B. Then, K symbols after a BFR response is received from the base station, the UE may apply a candidate beam to a subset of channels and/or all channels corresponding to a previously indicated unified TCI state for all CCs in the CCG. As an example, K may be selected as 28 symbols plus an offset, where the offset is for cross-CC beam indication, which can be predefined and/or reported by a UE capability and/or configured by the base station. The UE may trigger a BFRQ when one or multiple CCs fail. In some instances, the UE may trigger the BFRQ corresponding to one CC when more than one of the CCs fail. Note that when multiple CCs fails, the UE may report BFRQ for one CC, which may be determined by a CC ID and/or a type of CC, e.g., primary cell (PCell), primary secondary cell (PS-Cell), or secondary cell (SCell), and the remaining procedure may be as described above in reference to FIG. 9C. In some instances, the UE may trigger the BFRQ corresponding to multiple CCs when more than one of the CCs fail. Note that if and/or when the UE reports different candidate beams in the BFRQ when multiple CCs fail, multiple options may be available to select a beam. For example, the UE may apply a candidate beam reported in the BFRQ for the failed CC with a lowest and/or highest CC, e.g., when a CCG includes a PCell/PSCEll and at least one SCell. As another example, the base station may indicate the beam to be applied based on the reported candidate beams in the BFRQ by a BFRQ response, e.g., when all CCs in the CCG are SCell. Note that all failed CC indexes may be reported by a single MAC CE for BFR. As a further example, the UE may only report one candidate beam when multiple CCs fail.

In some embodiments, a target channel to apply a candidate beam may be determined by an indicated TCI. For example, if and when there are separate TCI, e.g., separate DL/UL TCI, provided, the candidate beam may be applied for downlink channels, e.g., PDCCH/PDSCH. As another example, if and/or when there is a joint TCI provided, the candidate beam may be applied for downlink channels and uplink channels, e.g., PDCCH/PDSCH/PUCCH/PUSCH/SRS. As a further example, the candidate beam may always be applied for both UL/DL channels.

In some embodiments, if and/or when a candidate beam is applied for uplink channel, some of or all the power control parameters for the uplink channel, e.g., P0, alpha, pathloss reference signal and closed-loop process index, may be reset to be based on a default value. The default value may be common or different for different channels. Additionally, pathloss may be derived based on a DL RS reported for candidate beam detection.

Figure 10:
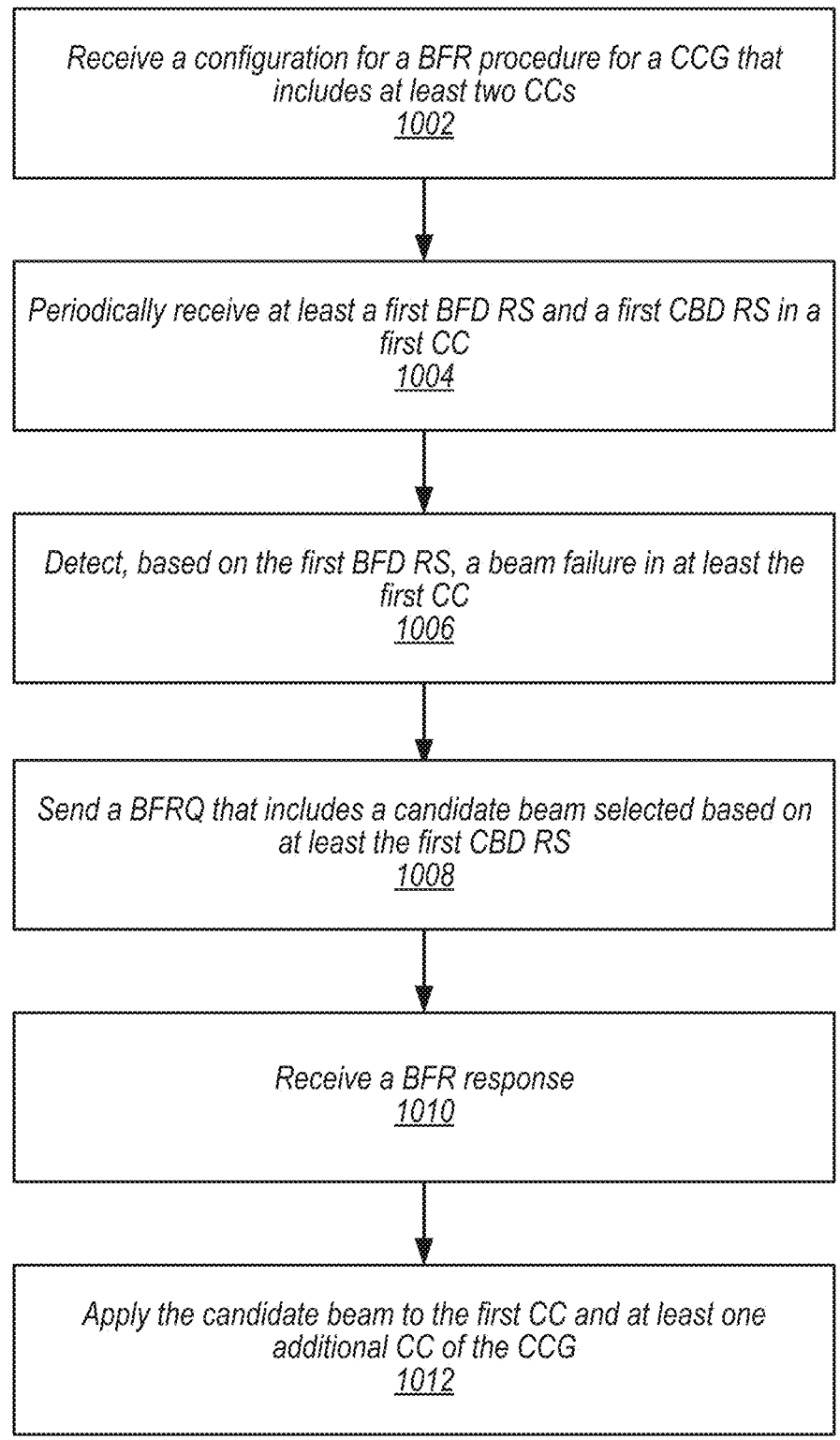
FIG. 10 illustrates a block diagram of an example of a method for UE beam failure recovery based on a unified TCI framework, according to some embodiments.

FIG. 10 illustrates a block diagram of an example of a method for UE beam failure recovery based on a unified TCI framework, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106, may receive, from a base station, such as base station 102, a configuration for a beam failure recovery (BFR) procedure for a component carrier (CC) group (CCG). The CCG may include at least two CCs.

At 1004, the UE may periodically receive, from the base station, at least a first beam failure detection (BFD) reference signal (RS) and a first candidate beam detection (CBD) RS in a first CC of the at least two CCs included in the CCG.

At 1006, the UE may detect, based on the first BFD RS, a beam failure in at least the first CC.

At 1008, the UE may send, to the base station, a beam failure recovery (BFR) request (BFRQ). The BFRQ may include a candidate beam selected based on at least the first CBD RS. The BFRQ may be sent via a physical random access channel (PRACH) or a medium access control (MAC) control element (CE). In some instances, whether to send the BFRQ via the PRACH or the MAC CE may be predefined, e.g., by standard and/or network/UE preference. In some instances, whether to send the BFRQ via the PRACH or the MAC CE may be configured via a higher layer singling exchange between the UE and base station. The higher layer signaling may include one of radio resource control signaling or a MAC CE. In some instances, whether to send the BFRQ via the PRACH or the MAC CE may be determined, e.g., by the UE, based, at least in part, on a CC configured with BFR or whether a primary cell or primary secondary cell is included in the CCG. For example, when the primary cell or the primary secondary cell is included in the CCG, the BFRQ may sent via the PRACH. As another example, when the primary cell or primary secondary cell is not included in the CCG, the BFRQ may be sent via the MAC CE.

At 1010, the UE may receive, from the base station, a BFR response.

At 1012, the UE may apply the candidate beam to the first CC and at least one additional CC of the CCG. In some instances, the UE may wait a configured number of symbols after receipt of the BFR response prior to applying the candidate beam. The configured number of symbols may include an offset. The offset may account for a cross-CC beam indication. In some instances, the UE may report the offset via a UE capability. In some instances, the UE may receive, from the base station, a configuration message that may indicate the offset. Additionally, the offset may be predefined, e.g., by standard and/or network/UE preference.

In some instances, applying the candidate beam to the first CC and at least one additional CC of the CCG may include the UE applying the candidate beam to a subset of channels corresponding to a previously indicated unified Transmission Configuration Indicator (TCI) State for all CCs in the CCG. In some instances, applying the candidate beam to the first CC and at least one additional CC of the CCG may include the UE applying the candidate beam to all channels corresponding to a previously indicated unified TCI State for all CCs in the CCG.

In some instances, the UE may determine a targeted channel to apply the candidate beam based on an indicated TCI. For example, when a downlink TCI and an uplink TCI is indicated, the candidate beam may be applied for downlink channels. Note that the downlink channels may include at least one of a physical downlink control channel (PDCCH) or a physical downlink shared channel (PDSCH). As another example, when a joint TCI is indicated, the candidate beam may be applied for downlink channels and uplink channels. Note that the downlink channels may include at least one of a PDCCH or a PDSCH and the uplink channels may include at least one of a physical uplink control channel (PUCCH), a physical uplink shared channel (PUSCH), or a sounding reference signal (SRS). As a further example, the candidate beam may be applied for downlink channels and uplink channels. Note that the downlink channels may include at least one of a PDCCH or a PDSCH and the uplink channels may include at least one of a PUCCH, a PUSCH, or an SRS. In some instances, when the candidate beam is applied to an uplink channel, the UE may reset at least a portion of power control parameters associated with the uplink channel based on a default value. Note that the power control parameters may include one or more of a P0 parameter, a pathloss reference signal index, or a closed-loop process index. The default value may be common to all channels in the CCG or each channel in the CCG may be associated with a default value. In some instances, the UE may derive pathloss based on a downlink RS reported for CBD.

In some instances, the configuration for the BFR procedure may configure BFR in only one active bandwidth part in the first CC, may configure cross CC BFD RS and CBD RS, may configure configures multiple BFD RSs, and/or may configure multiple BFR procedures for the CCG.

In some instances, when the configuration for the BFR procedure configures multiple BFD RSs, the UE may receive BFD RSs for each CC of the CCG independently. In some instances, the configuration for the BFR procedure may configure a common CBD RS for all CCs in the CCG. In some instances, the UE may trigger the BFRQ based on detection of failure of at least one CC in the CCG and/or based on detection of failure of a subset of CCs in the CCG.

In some instances, when the configuration for the BFR procedure configures multiple BFR procedures for the CCG, the UE may report a maximum number of CCs in the CCG for BFR/BFD as a UE capability. Note that when the UE reports a maximum of one CC for BFR, the configuration for the BFR procedure may configure one BFR procedure for the CCG. In some instances, the UE may trigger the BFRQ based on detection of failure of at least one CC in the CCG. In such instances, when multiple CCs fail, the UE may report BFRQ for one CC. The one CC may be determined by at least one of a CC index or a type of CC. Note that the type of CC may include a first type of CC in which a primary cell, a primary secondary cell, or a secondary cell is included in the CC and a second type of CC in which a primary cell, a primary secondary cell, or a secondary cell is not included in the CC. In some instances, the UE may report BFRQ for one CC based on the CCG including a primary cell or a primary secondary cell and at least one secondary cell. In some instances, when multiple CCs fail, the UE may report BFRQ for multiple CCs. Additionally, when the UE reports different candidate beams in the BFRQ when multiple CCs fail, the UE may apply a candidate beam reported in the BFRQ for a failed CC with a lowest CC index, apply a candidate beam reported in the BFRQ for a failed CC with a highest CC index, and/or receive, from the base station, an indication of a beam to be applied based on the candidate beams reported in the BFRQ in the BFR response. In some instances, the UE may be restricted to reporting only one candidate beam when multiple CCs fail. In some instances, the UE may report BFRQ for multiples CCs based on the CCG including only secondary cells. In such instances, the BFRQ may include indexes for each failed CC and the indexes may be included in a MAC CE.

Embodiments described herein provide systems, method, and mechanisms for beam failure recovery based on a unified TCI framework, e.g., in 5G NR systems and beyond. In some embodiments, a UE, such as UE 106, may It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform communications;
wherein the one or more processors are configured to cause the UE to:
receive, from a base station, a configuration for a beam failure recovery (BFR) procedure for a component carrier (CC) group (CCG), wherein the CCG includes at least two CCs;
periodically receive, from the base station, at least a first beam failure detection (BFD) reference signal (RS) and a first candidate beam detection (CBD) RS in a first CC based on the configuration;
detect, based on the first BFD RS, a beam failure in at least the first CC;
send, to the base station, a beam failure recovery (BFR) request (BFRQ) via a medium access control (MAC)

control element (CE), wherein the BFRQ includes a candidate beam selected based on at least the first CBD RS;

receive, from the base station, a BFR response; and apply the candidate beam to a subset of channels or all channels corresponding to a previously indicated unified Transmission Configuration Indicator (TCI) State for all CCs in the CCG.

2. The UE of claim 1, wherein the one or more processors are further configured to cause the UE to wait a configured number of symbols after receipt of the BFR response prior to applying the candidate beam, wherein the configured number of symbols includes an offset, and wherein the offset accounts for a cross-CC beam indication.

3. The UE of claim 2, wherein the one or more processors are further configured to cause the UE to report the offset via a UE capability.

4. The UE of claim 2, wherein the one or more processors are further configured to cause the UE to receive, from the base station, a configuration message that indicates the offset.

5. The UE of claim 1, wherein whether to send the BFRQ via the PRACH or the MAC CE is predefined or configured via a higher layer singling exchange between the UE and base station, and wherein the higher layer signaling includes one of radio resource control signaling or a MAC CE.

6. The UE of claim 1, wherein whether to send the BFRQ via the PRACH or the MAC CE is determined, by the UE, based on a CC configured with BFR or whether a primary cell or primary secondary cell is included in the CCG, wherein, when the primary cell or the primary secondary cell is included in the CCG, the BFRQ is sent via the PRACH, and wherein, when the primary cell or primary secondary cell is not included in the CCG, the BFRQ is sent via the MAC CE.

7. A processor, comprising:

a memory; and processing circuitry in communication with the memory and configured to:

receive, from a base station, a configuration for a beam failure recovery (BFR) procedure for a component carrier (CC) group (CCG), wherein the CCG includes at least two CCs;

periodically receive, from the base station, at least a first beam failure detection (BFD) reference signal (RS) and a first candidate beam detection (CBD) RS in a first CC based on the configuration;

send, to the base station, a beam failure recovery (BFR) request (BFRQ) based on detecting a beam failure in at least the first CC via a medium access control (MAC) control element (CE), wherein the BFRQ includes a candidate beam selected based on at least the first CBD RS; and apply, in response to receiving a BFR response from the base station; the candidate beam to a subset of channels or all channels corresponding to a previously indicated unified Transmission Configuration Indicator (TCI) State for all CCs in the CCG.

8. The processor of claim 7, wherein the processing circuitry is further configured to:

determine a targeted channel to apply the candidate beam based on an indicated Transmission Configuration Indicator (TCI), wherein, when a downlink TCI and an uplink TCI is indicated, the candidate beam is applied for downlink channels, wherein, when a joint TCI is indicated, the candidate beam is applied for downlink channels and uplink channels, wherein the downlink channels included at least one of a physical downlink control channel (PDCCH) or a physical downlink shared channel (PDSCH), and wherein the uplink channels included at least one of a physical uplink control channel (PUCCH), a physical uplink shared channel (PUSCH), or a sounding reference signal (SRS).

9. The processor of claim 7, wherein the candidate beam is applied for downlink channels and uplink channels, wherein the downlink channels included at least one of a physical downlink control channel (PDCCH) or a physical downlink shared channel (PDSCH), and wherein the uplink channels included at least one of a physical uplink control channel (PUCCH), a physical uplink shared channel (PUSCH), or a sounding reference signal (SRS).

10. The processor of claim 7, wherein, when the candidate beam is applied to an uplink channel, the processing circuitry is further configured to reset at least a portion of power control parameters associated with the uplink channel based on a default value, wherein the power control parameters include one or more of a P0 parameter, a pathloss reference signal index, or a closed-loop process index, and wherein the default value is common to all channels in the CCG or each channel in the CCG is associated with a default value.

11. The processor of claim 7, wherein the processing circuitry is further configured to derive a pathloss based on a downlink RS reported for CBD.

12. The processor of claim 7, further comprising:

waiting a configured number of symbols after receipt of the BFR response prior to applying the candidate beam, wherein the configured number of symbols includes an offset, and wherein the offset accounts for a cross-CC beam indication.

13. A method, comprising:

receiving, from a base station, a configuration for a beam failure recovery (BFR) procedure for a component carrier (CC) group (CCG), wherein the CCG includes at least two CCs;

periodically receiving, from the base station, at least a first beam failure detection (BFD) reference signal (RS) and a first candidate beam detection (CBD) RS in a first CC based on the configuration;

sending, to the base station, a beam failure recovery (BFR) request (BFRQ) based on detecting a beam failure in at least the first CC via a medium access control (MAC) control element (CE), wherein the BFRQ includes a candidate beam selected based on at least the first CBD RS; and applying, in response to receiving a BFR response from the base station; the candidate beam to a subset of channels or all channels corresponding to a previously indicated unified Transmission Configuration Indicator (TCI) State for all CCs in the CCG.

14. The method of claim 13, wherein the configuration for the BFR procedure configures BFR in only one active bandwidth part in the first CC.

15. The method of claim 13, wherein the configuration for the BFR procedure configures cross CC BFD RS and CBD RS.

16. The method of claim 13,
wherein the configuration for the BFR procedure configures multiple BFD RSs, wherein BFD RSs for each CC of the CCG are independently received, wherein the configuration for the BFR procedure configures a common CBD RS for all CCs in the CCG, and wherein the method further comprises at least one of:
- triggering the BFRQ based on detection of failure of at least one CC in the CCG; or
- triggering the BFRQ based on detection of failure of a subset of CCs in the CCG.

17. The method of claim 13,
wherein the configuration for the BFR procedure configures multiple BFR procedures for the CCG, wherein the method further comprises:
- reporting a maximum number of CCs in the CCG for BFR/BFD as a user equipment device (UE) capability, wherein, when a maximum of one CC for BFR is reported, the configuration for the BFR procedure configures one BFR procedure for the CCG; and
- triggering the BFRQ based on detection of failure of at least one CC in the CCG, wherein, when multiple CCs fail, BFRQ for one CC is reported, wherein the one CC is determined by at least one of a CC index or a type of CC, wherein the type of CC includes a first type of CC in which a primary cell, a primary secondary cell, or a secondary cell is included in the CC and a second type of CC in which a primary cell, a primary secondary cell, or a secondary cell is not included in the CC, wherein the BFRQ for one CC is reported based on the CCG including a primary cell or a primary secondary cell and at least one secondary cell, and wherein, when_multiple CCs fail, the method further comprises reporting BFRQ for multiple CCs, wherein, when different candidate beams in the BFRQ when multiple CCs fail are reported, the method further comprises at least one of:
- applying a candidate beam reported in the BFRQ for a failed CC with a lowest CC index;
- applying a candidate beam reported in the BFRQ for a failed CC with a highest CC index; or
- receiving, from the base station, an indication of a beam to be applied based on the candidate beams reported in the BFRQ in the BFR response.

18. The method of claim 13,
wherein, one candidate beam is reported when multiple CCs fail.

19. The method of claim 13,
wherein the BFRQ for multiples CCs based on the CCG including only secondary cells is reported, wherein the BFRQ includes indexes for each failed CC, and wherein the indexes are included in MAC CE.

20. The method of claim 13, further comprising:
waiting a configured number of symbols after receipt of the BFR response prior to applying the candidate beam, wherein the configured number of symbols includes an offset, and wherein the offset accounts for a cross-CC beam indication.

* * * * *